United States Patent [19]

Tosaka et al.

[11] Patent Number: 4,888,604
[45] Date of Patent: Dec. 19, 1989

[54] FILM CODE READ OUT DEVICE

[75] Inventors: Yoichi Tosaka, Kanagawa; Toru Shoji, Tokyo, both of Japan

[73] Assignee: Canon Kabushiki Kaisha, Tokyo, Japan

[21] Appl. No.: 220,471

[22] Filed: Jul. 18, 1988

Related U.S. Application Data

[63] Continuation of Ser. No. 943,048, Dec. 18, 1986, abandoned.

[30] Foreign Application Priority Data

Dec. 26, 1985 [JP] Japan .................................. 60-295970

[51] Int. Cl.$^4$ .............................................. G03B 7/24
[52] U.S. Cl. ..................................................... 354/21
[58] Field of Search .......................... 354/21; 352/78 C

[56] References Cited

U.S. PATENT DOCUMENTS

4,582,408  4/1986  Miki et al. .............................. 354/21

Primary Examiner—W. B. Perkey
Attorney, Agent, or Firm—Fitzpatrick, Cella, Harper & Scinto

[57] ABSTRACT

The present invention relates to a film code read out device for a film cartridge having a code pattern such as ISO, film frame number information and so on. The film code read out device according to the present invention is arranged in such a manner that contact members to be in contact with the code pattern are brought into contact with the code pattern at a position deviating from the center of the code pattern in the state in which the film cartridge is loaded in a film cartridge chamber correctly.

4 Claims, 5 Drawing Sheets

FILM CODE READ OUT DEVICE

This application is a continuation of application Ser. No. 943,048, filed Dec. 18, 1986, now abandoned.

BACKGROUND OF THE INVENTION

1. Field of the Invention

The present invention relates to a film information read out device for reading out film information from a film cartridge having an information code portion of the coded information such as of the film sensitivity, the film frame number and so on.

2. Description of the Related Art

Figure 6:
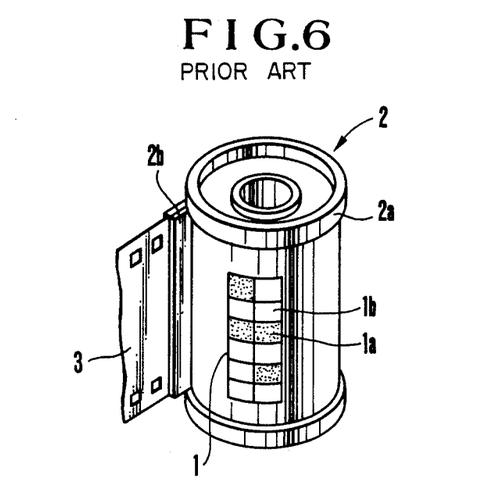
FIG. 6 shows a perspective of a film cartridge.

A film cartridge 2 provided with an information code portion 1 of coded film information, such as film sensitivity, the film frame number etc. on the periphery thereof as is shown in FIG. 6, is widely used. More particularly, the information code portion 1 consists of a conductive portion 1a and a non-conductive portion 1b, whereby respective information of the film 3 loaded in the film cartridge 2 is displayed by the combination of the patterns formed by portion 1.

In consequence, in order to read out the film information from such a film cartridge 2 it is necessary to provide at the camera side a plural number of contacts projecting so as to be in contact with the above information code portion 1. Such a film information read out device has been proposed in Japanese Laid-Open Patent Application No. Sho 60-158424, and U.S. Patent Application Ser. No. 783,847.

When film information is read out device of this kind, the contact state of the above contact between the plurality of contacts and the information code portion 1 often varies due to the floating of the film outlet of the cartridge or the vibration of the camera. If such variation in the contact state takes place, the positional relation of the above information code portion 1 with the contacts at the camera side can not be maintained with the result that the above conductive portion 1a is misjudged as non-conductive and the above non-conductive portion 1b is misjudged as conductive so as to lead to a mis-read-out of the film information, which is disadvantageous.

If the contact pressure of a plural number of contacts against the periphery of the film cartridge varies, there is a danger that the coating on the surface of the film cartridge will be damaged by the contact and the contacts will enter into contact with the metallic portion of the cartridge, which also problematically leads to the misoperation of the camera. Further, if the contact pressure is raised, an undesirable influence is given to the winding and the rewinding of the film as well as the surface of the film. Further, although it is possible to compulsorily urge the film outlet against the stopper portion formed of the camera body in order to stabilize the positional relation between the contact with the information code portion, the film drawing strength is varied due to the deformation of the cartridge if strength is given to the film outlet, which is also disadvantageous.

SUMMARY OF THE INVENTION

One aspect of the invention is to provide a film information read out device free from the above shortcomings and capable of avoiding the mis-read-out of the film information on the cartridge.

Another aspect of the invention is to provide a film information read out device free from the above problems and having a plural number of contacts for reading out the film information from the information code portion provided on the periphery of the cartridge. The invention is so designed that in the state in which the film cartridge is loaded in the film cartridge chamber, as viewed from the above so as to face to the information code portion, the contacts which are to be in contact with the information code portion are off set outwardly from the information code portion.

Other purposes of the present invention will become evident from the explanations to be made below with reference to the drawings of the embodiment of the invention.

DETAILED DESCRIPTION OF THE PREFERRED EMBODIMENT

Below, the present invention will be explained in a concrete way in accordance with FIGS. 1–5 illustrating an embodiment thereof.

Figure 4:
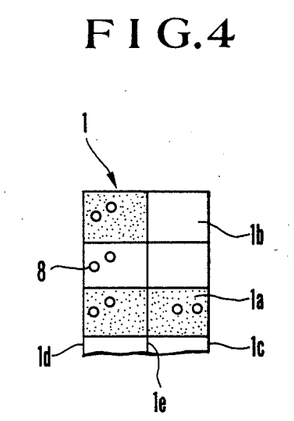
FIG. 4 shows the relation between the information code portion and the contact pins in the case shown in FIG. 2.
Figure 5:
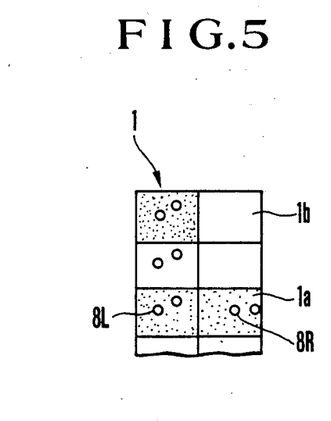
FIG. 5 shows the same relation as above in the case shown in FIG. 3.
Figure 7:
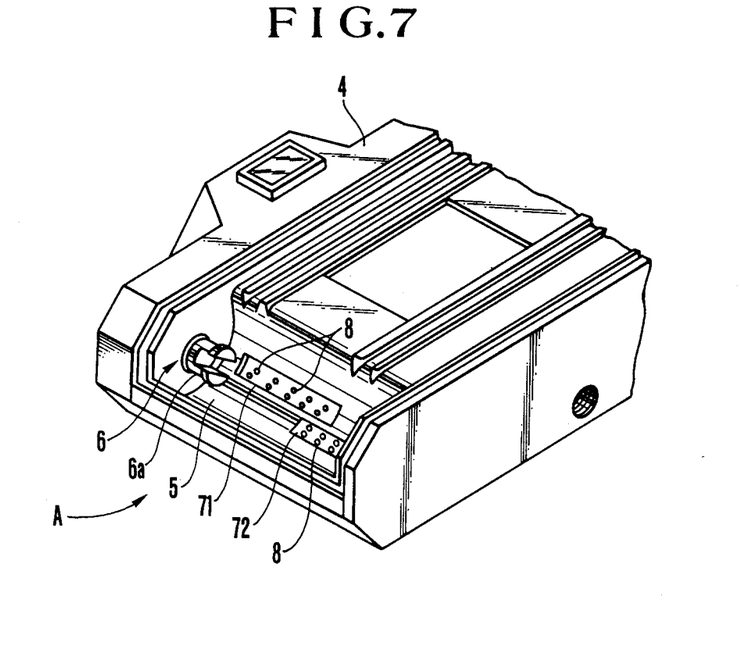
FIG. 7 is a perspective view of important parts of a camera provided with the film information read out device of the present invention, whereby the back cover is taken off.
Figure 8:
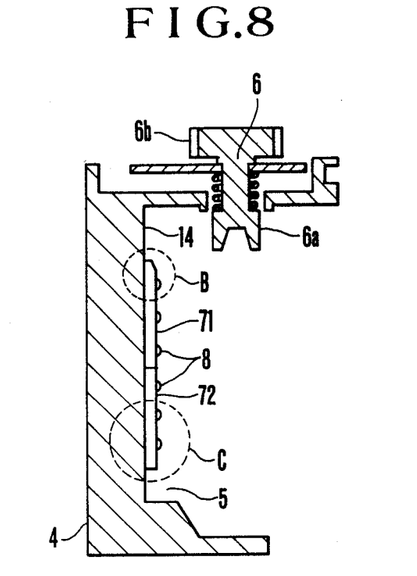
FIG. 8 shows a side of the film cartridge chamber in FIG. 7, seen along the direction A.

The conductive portion 1a and the non-conductive portion 1b of the information code part 1 are generally formed at the right and the left sides so as to be adjacent to each other as is shown FIGS. 4–6. Consequently, the contacts of the film cartridge chamber 5 are arranged in few rows as is shown in FIG. 7. Further, the contacts in the forms of contact pins 8 are arranged so as to provide two pins for one connection in such a manner that for example even if there exist dust or the like between the one contact pin 8 and the information code portion 1 corresponding thereto on the film cartridge 2, the contact of the other contact pin 8 with the corresponding information code portion 1 can be secured.

When then the film draw out portion 2b of the film cartridge 2 is in contact with the projection 17 of the film cartridge chamber 5, the contact pin 8 enters into contact with the information code portion 1 of the film cartridge 2.

Seen along the direction towards the information code portion 1 of the film cartridge 2 to be loaded in the film cartridge chamber 5 in the above-mentioned construction (along the direction D in FIG. 2 and E in FIG. 3), the contact pins 8 are off set outwardly from the information code part 1.

Namely, let the angles between the line connecting the center O of the film cartridge 2 with the ends 1c and 1d of the information code portion 1 and the separating line 1e of the adjacent information be $\theta 1$ and $\theta 3$, respectively, and the angles between the external ends of the angles $\theta 1$ and $\theta 3$ and the center between a pair of the contact pins 8 be $\theta 2$ and $\theta 4$, respectively, so the following relations are obtained.

$$\theta 2 < \theta 1 - \theta 2, \theta 4 < \theta 3 - \theta 4$$

Figure 1:
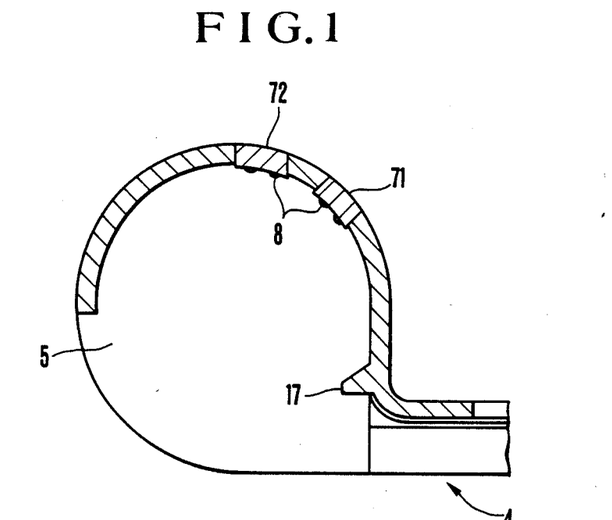
FIG. 1 shows a cross-section of the film cartridge.
Figure 2:
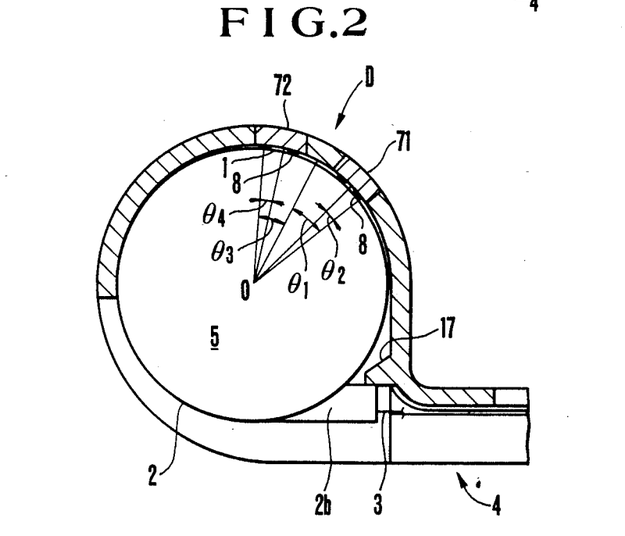
FIG. 2 shows a cross-section of the film cartridge chamber in the state in which the film cartridge is loaded correctly.

In case the contact pins 8 are arranged as mentioned above, the contact state of the contact pins 8 with the conductive 1a and the non-conductive portion 1b is as is shown in FIG. 4 in the correctly loaded state of the film cartridge in which, as is shown in FIG. 2, the film draw out portion 2b of the film cartridge 2 is in contact with the projection 17 of the film cartridge chamber 5.

Figure 3:
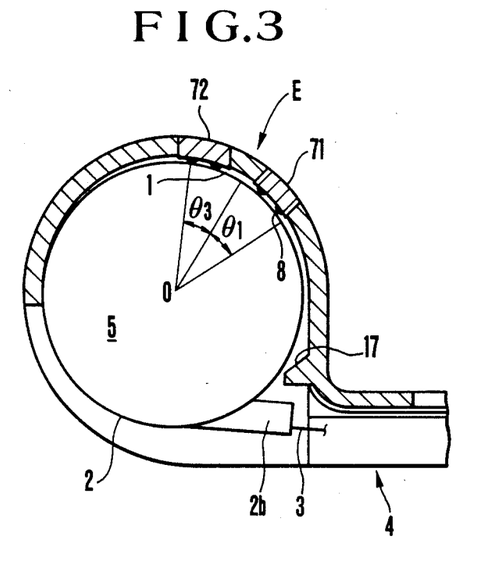
FIG. 3 shows a cross-section of the film cartridge chamber in the state in which the film cartridge is loaded floating.

In case the film cartridge 2 is loaded in the film cartridge chamber 5 in the floating state as is shown in FIG. 3, the film cartridge 2 tends to rotate along the clockwise direction, whereby, as mentioned above, the contact pins 8 are off set outwardly from to the information code portion 1 so that the contact pins 8 are in contact with the information code portions 1 as is shown in FIG. 5 in such a manner that the information is transmitted correctly between the contact pins 8 and the information code portion 1. Namely, the information code portion 1 shown with the angle $\theta 1$ is positioned almost in front of the contact pins 8L supported by the cover 71 (to be explained is detail later) so that both are brought into contact with each other smoothly. On the other hand, although the information code portion 1 shown with the angle $\theta 3$ moves along the direction away from the contact pins 8R supported by the cover 72, even in the worst case the transmission of the information is effected by one of the contact pins 8.

Figure 9:
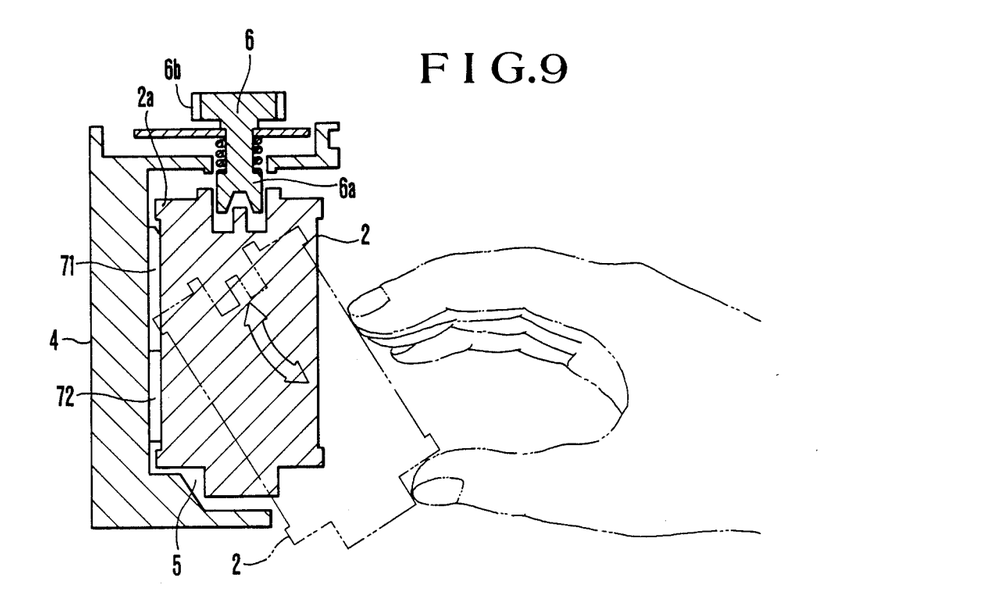
FIG. 9 is an explanatory drawing of the invention at the time of film loading.

Below, other members will be explained in detailed in accordance with the drawings. 4 is a camera body, and 7 is a rewinding shaft provided on the upper part of the camera body 4, whereby the fork 6a engaging with the spool of the film cartridge 2 is constructed as one body with the gear portion 6b engaging the gear row for automatic rewinding. Many of the conventional cameras are designed in such a manner that the fork 6a is withdrawn upwardly so as not to be in a way at the time of the film loading and unloading. However, in the case of recent cameras with built-in motor rewinding, it is not preferrable to withdraw the fork 6a from the point of view of construction as well as camera handling so that the film cartridge 2 is loaded from the beneath as is shown in FIG. 9 leaving the fork 6a in the film cartridge chamber 5.

Figure 11:
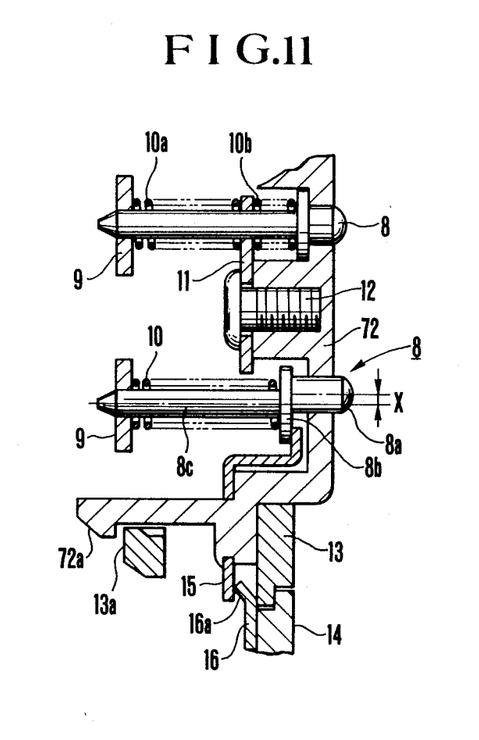
FIG. 11 shows a section of the part C in FIG. 8 in detail.

In the film cartridge chamber 5 are arranged the covers 71 and 72, which themselves constitute a part of the wall of the film cartridge chamber 5, so as to be movable freely along the radial direction in the film cartridge chamber 5. The above-mentioned plural number of the contact pins 8 for reading out the film information are held in the covers 71 and 72 so as to be projectable out of the covers 71 and 72. The contact pins 8 each consist of a contact portion 8a to be projected out of the above-mentioned covers 71 and 72, a flange portion 8b for prohibiting the pins 8 from escaping the covers 71, 72 and a foot portion 8c. As is shown in FIG. 11, the contact portion 8a of the contact pin 8 at the lowest end of the device is longer along the axial direction than the remaining pins, and the axis of the contact portion 8a is deviated upwards by x from that of the foot portion 8c. The end of the foot portion 8c is supported by the support portion 9, whereby a spring 10 is provided between the support portion 9 and the head portion 8b so as to always urge the contact pins 8 along the projecting direction.

The upper contact pin 8 in FIG. 11 is provided with a first long spring 10a and a second short spring 10b. On the inside of the cover 72 a spring holding portion 11 is secured by means of a screw 12 and a hole which the foot portion portion 8c of the contact pin 8 penetrates is provided. As a result, the first spring 10a urges the cover 72, while the second spring 10b urges the contact pin 8 along the direction along which the pin 8 projects out of cover 72. Also the cover 71 has a part having two springs having the same efficiency as the springs mentioned above, although not shown in the drawing. Thus, in the case of the present embodiment the lower contact pin 8 in FIG. 11 serves as the earth contact at the same time, whereby the lowerst support portion 9 is connected to the ground.

Figure 10:
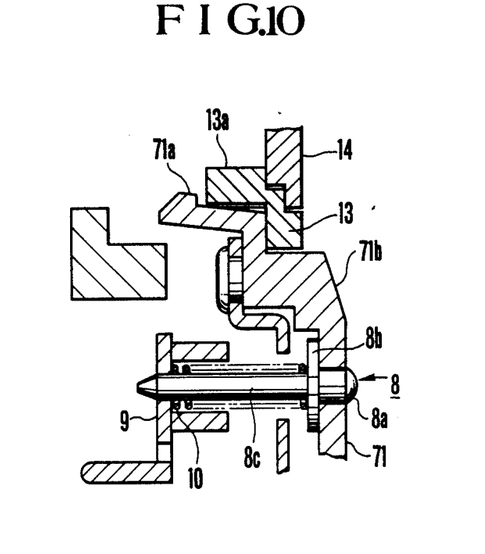
FIG. 10 shows a section of the part B in FIG. 8 in detail.

13 in FIGS. 10 and 11 is a cover holding member, whereby the anchor claws 71a, 72a of the covers 71, 72 are anchored by the anchor portion 13a so as to prevent the escape of the covers 71, 72. 14 is a wall of the film cartridge chamber 5, and 15 is a film cartridge detecting contact. The film cartridge detecting contact 15 presents an almost " " shaped section and its lower end is secured on the cover 72 as is shown in FIG. 11, while its upper end is in contact with the flange portion 8b of the contact pin 8. 16 is a contact piece secured on the inside of the wall 14 of the film cartridge chamber 5, whereby the bent end portion 16a of the contact piece 16 is in contact with the film cartridge detecting contact piece 15.

The film cartridge 2 is loaded by, being rotated along the clockwise direction in the state shown in a dot-dash line in FIG. 9 and lifted slightly so as to engage the spool of the film cartridge 2 with the fork 6a. Because at this time each of the contact pins 8 and the covers 71, 72 are withdrawn along the circumferential direction of the film cartridge chamber 5 with regard to the camera body 4, the film cartridge 2 can be moved smoothly to the portion shown in FIG. 11. When in this way the film cartridge 2 has reached its normal position, the above-mentioned contact pin 8 is brought into contact with the above-mentioned information code portion 1 of the film cartridge 2 so as to transmit the necessary information to the camera side.

Figure 12:
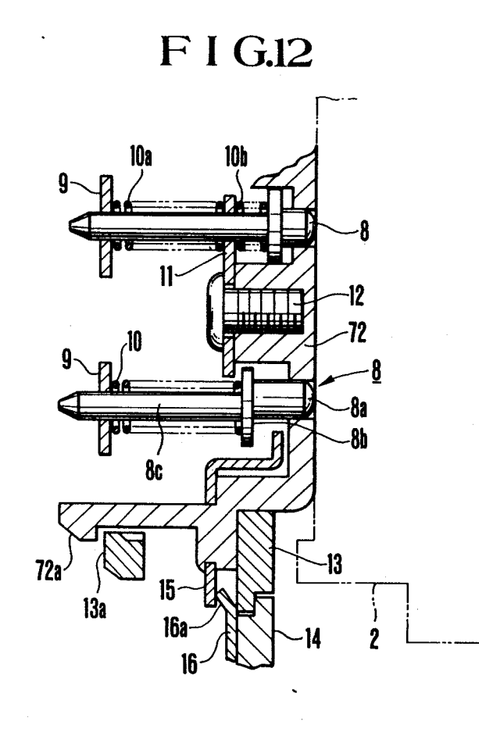
FIG. 12 shows a lengthwise section of the film cartridge chamber when a film cartridge has been loaded.

At the time of the film cartridge loading, the flange portion 8b of the contact pin 8 withdraws as is shown in FIG. 12 so as to leave the film cartridge detecting contact piece 15. This flange portion 8b and the piece 15, as electric contacts are connected to a display circuit for displaying the presence of the film cartridge so as to display the presence or the absence of the film cartridge by LED liquid crystal or the like.

The film cartridge 2 is taken out by the reverse operation from the above, whereby because a slant plane 71b is formed at the upper end portion of the cover 71 as is shown in FIG. 10 there is no danger that the projecting part 2a of the flange portion at the upper end of the film cartridge 2 strikes at the corner of the cover 71.

Because the slant plant 71b is formed at the upper end portion of the cover 71 provided with the contact pin 8, it is possible to smoothly load and unload the film cartridge 2, while the contact means can be built in the camera body as one unit, which contributes much to the improvement of its operability.

As explained so far, the present invention provides a film information read out device which is free from the mistaken readout of the film information even if the interior contact of the information code portion takes place due to the floating of the film cartridge or the vibration of the camera body, by a simple modification of the off-set position of the information read out contact.

What is claimed is:

1. A film information read out device for reading out a code of a code pattern portion on a film cartridge, wherein said code pattern portion comprises a conductive part and a non-conductive part, and wherein said device comprises:
   (a) a projection provided proximate to an exposure opening end of the film cartridge chamber and projecting toward the film cartridge chamber, said projection regulating a loading position of the cartridge by contact with a film draw out portion of the cartridge when the film cartridge is loaded into the cartridge chamber; and
   (b) a plurality of contact members being disposed in first and second rows for reading out the code pattern portion, at least one of the contact members being adapted to be brought into contact with a respective corresponding part of the code pattern portion when the film cartridge is loaded into a film cartridge chamber, each one of said contact members being arranged at a side of the film cartridge chamber, the first row of said contact members being disposed so as to contact the code pattern portion at a position offset toward said projection at a predetermined distance from a line dividing the width of the conductive part into two halves when the film cartridge is loaded such that the film draw out portion of the cartridge is in contact with said projection and the second row of said contact members being disposed so as to contact the code pattern portion at a position offset in a direction away from said projection at a predetermined distance from a line dividing the width of the conductive part into two halves when the film cartridge is loaded such that the film draw out portion of the cartridge is in contact with said projection.

2. A device according to claim 1, wherein said conductive part comprises a plurality of conductive areas and said non-conductive part comprises a plurality of non-conductive areas, and the code pattern portion includes a row extending in a lengthwise direction of said film cartridge containing a plurality of conductive areas and non-conductive areas in a prescribed combination, wherein said contact members are provided at one or more of said areas and each contact member comprises two contact piece members, and wherein each contact member is placed at such position that a center between the two contact piece members is offset toward said projection at a predetermined distance from the center of the width of each area when the cartridge is loaded such that said a film draw out portion of the cartridge is in contact with said projection.

3. A film information read out device for reading out a code of a code pattern portion of a film cartridge, in which two rows of code pattern portions arranged in a lengthwise direction of the film cartridge, wherein said two rows are adjacent each other in the lengthwise direction of the film cartridge, each row of said code pattern portion containing a plurality of conductive areas and non-conductive areas in a prescribed combination wherein said device comprises:
   (a) a projection provided proximate to an exposure opening end of the film cartridge chamber and projecting toward said film cartridge chamber, said projection regulating a loading position of the cartridge by contact with a film draw out portion of the cartridge when the film cartridge is loaded into the cartridge chamber; and
   (b) a plurality of contact members being respectively brought in contact with each area of the code pattern portion in each row to detect whether each area of each row is conductive or non-conductive whereby the code is read out, said plurality of contact members constituting a first row respectively contacting each area of the code pattern portion in a row close to said projection and a plurality of contact members constituting a second row respectively contacting each area of the code pattern portions in the other row, wherein when said film cartridge is loaded correctly into the cartridge chamber such that each contact member in the first row is spaced a predetermined distance in a direction toward a line dividing said predetermined width of its respective coresponding area of the code pattern portion into two halves in the row close to said projection, and each contact member in the second row is spaced a predetermined distance in a direction away from said projection from a line dividing said predetermined width of its corresponding area of the code pattern portion into two halves in the other row.

4. A device according to claim 3, wherein each contact member contacting each area comprises two contact piece members, and wherein when the film cartridge is loaded into the film cartridge chamber under a state the film draw out portion of the film cartridge contacts the projection, a center line connecting both of the two contact members are placed at a position spaced a predetermined distance from the center of each area.

* * * * *

UNITED STATES PATENT AND TRADEMARK OFFICE
CERTIFICATE OF CORRECTION

PATENT NO. : 4,888,604

DATED : December 19, 1989

INVENTOR(S) : Yoichi Tosaka, et al.

It is certified that error appears in the above-identified patent and that said Letters Patent is hereby corrected as shown below:

COLUMN 1:

Line 24, "In consequence, in" should read --In--.

Line 32, "when film information is read out device" should read --In a film information read out device--.

COLUMN 2:

Line 57, "forms" should read --form--.

COLUMN 3:

Line 19, "conductive 1a" should read --conductive portion 1a--.

Line 28, "to" should be deleted.

Line 36, "is" should read --in--.

Line 44, "detailed" should read --detail--.

UNITED STATES PATENT AND TRADEMARK OFFICE
CERTIFICATE OF CORRECTION

PATENT NO. : 4,888,604

DATED : December 19, 1989

INVENTOR(S) : Yoichi Tosaka, et al.

It is certified that error appears in the above-identified patent and that said Letters Patent is hereby corrected as shown below:

COLUMN 4:

Line 6, "and" should read "whereby"

Line 9, "whereby" should read --and--.

Line 26, "lowerst" should read --lowest--.

Line 34, """ shaped section" should read --⌐ shaped section--.

Line 42, "loaded by," should read --loaded, by--.

COLUMN 5:

Line 3, "slant plant 71b" should read --slant plane 71b--.

COLUMN 6:

Line 54, "under a state" should read --such that--.

UNITED STATES PATENT AND TRADEMARK OFFICE
CERTIFICATE OF CORRECTION

PATENT NO. : 4,888,604

DATED : December 19, 1989

INVENTOR(S) : Yoichi Tosaka, et al.

It is certified that error appears in the above-identified patent and that said Letters Patent is hereby corrected as shown below:

COLUMN 6:

Line 56, "are" should read --is--.

Signed and Sealed this

Fourteenth Day of May, 1991

Attest:

HARRY F. MANBECK, JR.

Attesting Officer

Commissioner of Patents and Trademarks